US008527626B1

(12) United States Patent
Wang et al.

(10) Patent No.: US 8,527,626 B1
(45) Date of Patent: Sep. 3, 2013

(54) MANAGING SYSTEM POLLING

(75) Inventors: Yong Wang, Westborough, MA (US);
Utkarsh Vipul, Mansfield, MA (US);
Xuan Tang, Hopkinton, MA (US);
Lorenzo Bailey, Framingham, MA (US);
Ping Zhang, Shrewsbury, MA (US);
Ken Kim, Worcester, MA (US);
Muhamad Djunaedi, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 342 days.

(21) Appl. No.: 12/893,034

(22) Filed: Sep. 29, 2010

(51) Int. Cl.
*G06F 15/173* (2006.01)
(52) U.S. Cl.
USPC .......................................................... 709/224
(58) Field of Classification Search
USPC ................................ 709/224, 223, 225–229
See application file for complete search history.

(56) References Cited

U.S. PATENT DOCUMENTS

| 7,548,969 | B2 * | 6/2009 | Tripp et al. | 709/223 |
|---|---|---|---|---|
| 7,650,423 | B2 * | 1/2010 | Carden | 709/237 |
| 7,797,409 | B1 * | 9/2010 | Secer | 709/223 |
| 8,086,803 | B2 * | 12/2011 | Muthiah et al. | 711/133 |
| 2004/0139195 | A1 * | 7/2004 | Feather et al. | 709/224 |
| 2005/0210128 | A1 * | 9/2005 | Cannon et al. | 709/224 |
| 2008/0120620 | A1 * | 5/2008 | Lett et al. | 718/103 |

* cited by examiner

*Primary Examiner* — Ruolei Zong
(74) *Attorney, Agent, or Firm* — Krishnendu Gupta; Jason A. Reyes; Deepika Bhayana

(57) ABSTRACT

A method is used in managing system polling. Polling parameters that are based on a set of criteria are determined for receiving updated information for a managed object in a data storage system. Based on the polling parameters, the managed object is polled. Based on the set of criteria, polling parameters are dynamically changed. Based on the results of polling, polling is disabled for the managed object.

20 Claims, 9 Drawing Sheets

MANAGING SYSTEM POLLING

BACKGROUND

1. Technical Field

This application relates to managing system polling.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Configuration information may be associated with a data storage system. The configuration information may include information describing the physical and/or logical configuration in the data storage system. The logical configuration information may include, for example, information regarding logical objects such as RAID groupings, logically defined devices, and the like.

Client-server computer storage configurations or networks are well known. The "client" (human user, or graphical user interface (GUI), or workstation, etc.) is operatively coupled to hardware/software functionality known as the "server" which services the client by responding to client requests to store information and/or retrieve stored information. Multiple clients can be operatively coupled to multiple servers in a particular client-server network configuration.

Effective management of client-server networks is important to help ensure that the networks operate as intended and serve network users as expected. This management function may be accomplished through distributed management software which can be distributed throughout a client-server network. If a client-server network is running such software that is also object-oriented, typically many objects reside in each of the clients and/or servers. An object, in computer software terms, is a dedicated area of memory which can be thought of as an impervious container holding both data and instructions within itself, both defining itself and its relationships to other objects in the computer system or network. An object can send and receive messages to and from other objects, respond and react to such messages (e.g. commands) but shall normally be impervious to internal scrutiny. For example, in a storage processor each object may describe or relate to a specific tangible detail in the processor (e.g. a fan, power switch, cache memory, power supply, disk drive interface, etc.). These tangible objects in the storage processor can send messages to each other and to other objects outside the processor such as a disk array.

SUMMARY OF THE INVENTION

A method is used in managing system polling. Polling parameters that are based on a set of criteria are determined for receiving updated information for a managed object in a data storage system. Based on the polling parameters, the managed object is polled. Based on the set of criteria, polling parameters are dynamically changed. Based on the results of polling, polling is disabled for the managed object.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
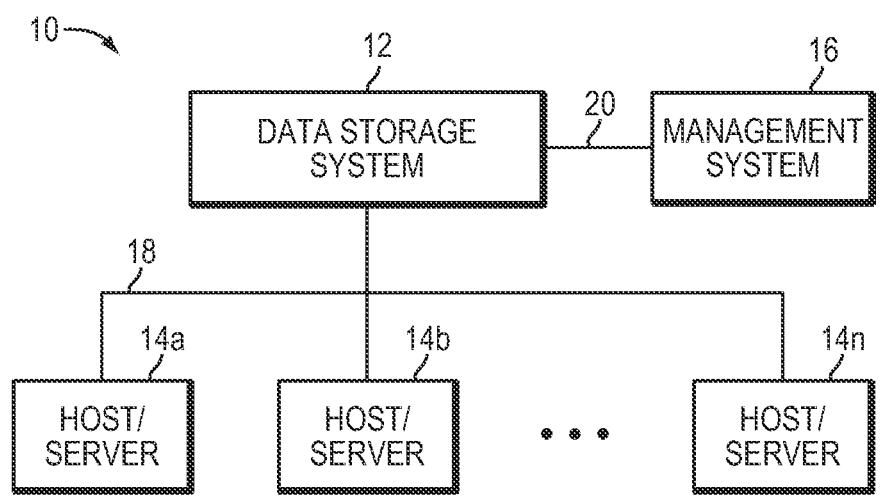
FIG. 1 is an example of an embodiment of a computer system that may utilize the techniques described herein.

Described below is a technique for use in managing system polling. In accordance with the technique, a method may be provided for efficient policy based polling process leveraging a standard polling process. In a particular example, data storage system ("array") status may be polled in an efficient manner, such that a new management system model adaptively changes the frequency of polling based on a set of criteria including data consumption and usage patterns of the configuration information associated with the data storage system.

Conventionally, the process of polling a system periodically polls at fixed intervals in a data storage system to receive configuration information changes that have occurred since the previous poll request. In the conventional system, the information is polled at fixed intervals irrespective of a client requesting the data. Generally, array objects managed by the management system are largely static—very few objects change from poll to poll. In at least some conventional cases, periodic polling at fixed intervals has some challenges:

Performance: periodic polling at a fixed interval causes unacceptable delays in receiving updated information if the interval is set too high or it triggers unnecessary array activity by polling continuously if the interval is set too low. Polling also competes with I/Os issued by a client or a host in turns deteriorating array performance and eventually renders the management system unusable or nearly unusable. Further, when a configuration information is updated, the client or the host has to explicitly poll to receive updated information complicating software logic and causing poor client performance. Continuous polling at fixed interval also causes increase utilization of system's CPU and memory resources.

Inefficient: periodic polling is triggered even at times when no consumers are requesting array configuration data, in turns wasting energy. Every poll request received from various subsystems is executed even though some poll requests are duplicate requests. Additionally, polling errors in one component could effect the manageability of the whole array as polling to faulty components is not disabled.

By contrast, in at least some implementations in accordance with the technique as described herein, polling only when configuration data is being updated or consumed allows the management software to be more efficient and provides ability to manage many more objects without excessive performance impact. In at least one storage system implementation as described below, changing the polling frequency based on a set of policies provides flexibility to users in managing the system more efficiently.

In at least some implementations in accordance with the technique as described herein, use of managing system polling can provide one or more of the following advantages: simplifying the client's polling logic by changing the polling based on a set of policies, reducing unnecessary array polling by removing duplicate polls, adaptively changing the polling frequency in turns reducing load on system resources, energy consumption and providing better error handling by disabling polling for faulted components.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSCI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSCI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

Figure 2:
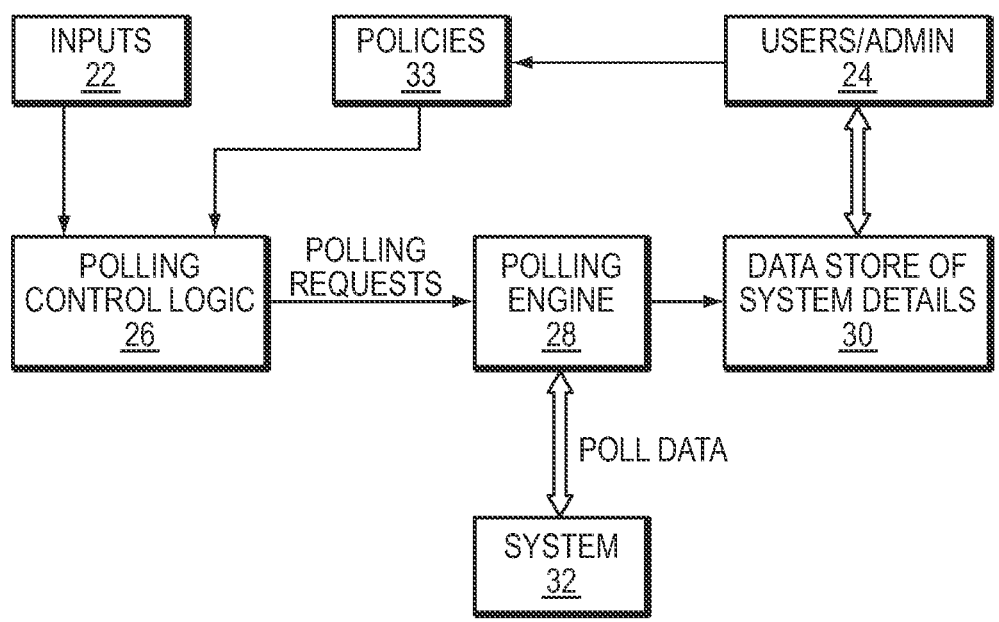
FIGS. 2-5 are diagrams illustrating in more detail components that may be used in connection with techniques herein.

Referring to FIG. 2, shown is a more detailed representation of components that may be included in an embodiment using the techniques herein. The polling control logic 26 and polling engine 28 components may be components included as part of internal management software for management of the data storage system, e.g., in support of management system 16. The elements 26 and 28 may also reside on a single hardware or software component. The data store of system details 30 includes data structures of configuration information for the data storage system 32. The configuration information may include data describing a defined configuration such as the different components as well as data regarding the performance and other aspects of these components. The configuration information may include information regarding physical components, logical components, and other general configuration information. The physical component information may include information about physical components in the data storage system, for example, the physical disks, fans, and the like. The logical component information may include information about the logically defined components such as, for example, the LUNs, defined RAID groupings (RGs), storage groups of LUNs (SGs), and the like. Such logical component information may include what storage groups are defined and what LUNs are included in each of the SGs. Other general configuration information may include, for example, the serial number of the data storage system, and the like.

It should be noted that although a database is used in connection with storing the configuration information, it will be appreciated by those skilled in the art that other data stores or data containers may be used.

The inputs 22 and policies 33 may represent other hardware and/or software components that may be included in the management system 16. The elements 22 and 33 may include software components such as, for example, other management software for management of the data storage system, and the like. Users of the data storage system 12 access the various configuration information stored in the data store 30 through command line interface or user interface and also updates the configuration information by changing the system configuration. Users 24 may also manage the system polling using a set of policies 33 that may include various rules that manage the polling frequency. The polling control logic 26 manages poll requests, coordinate different client polls and minimizes unnecessary polls by recognizing and eliminating duplicate poll requests. Based on the set of inputs 22 and policies 33, polling control logic manages the frequency at which poll request is sent to the polling engine 28. Polling engine 28 then executes that poll request and receives updated configuration information about a managed object in the data storage system 32.

Figure 3:
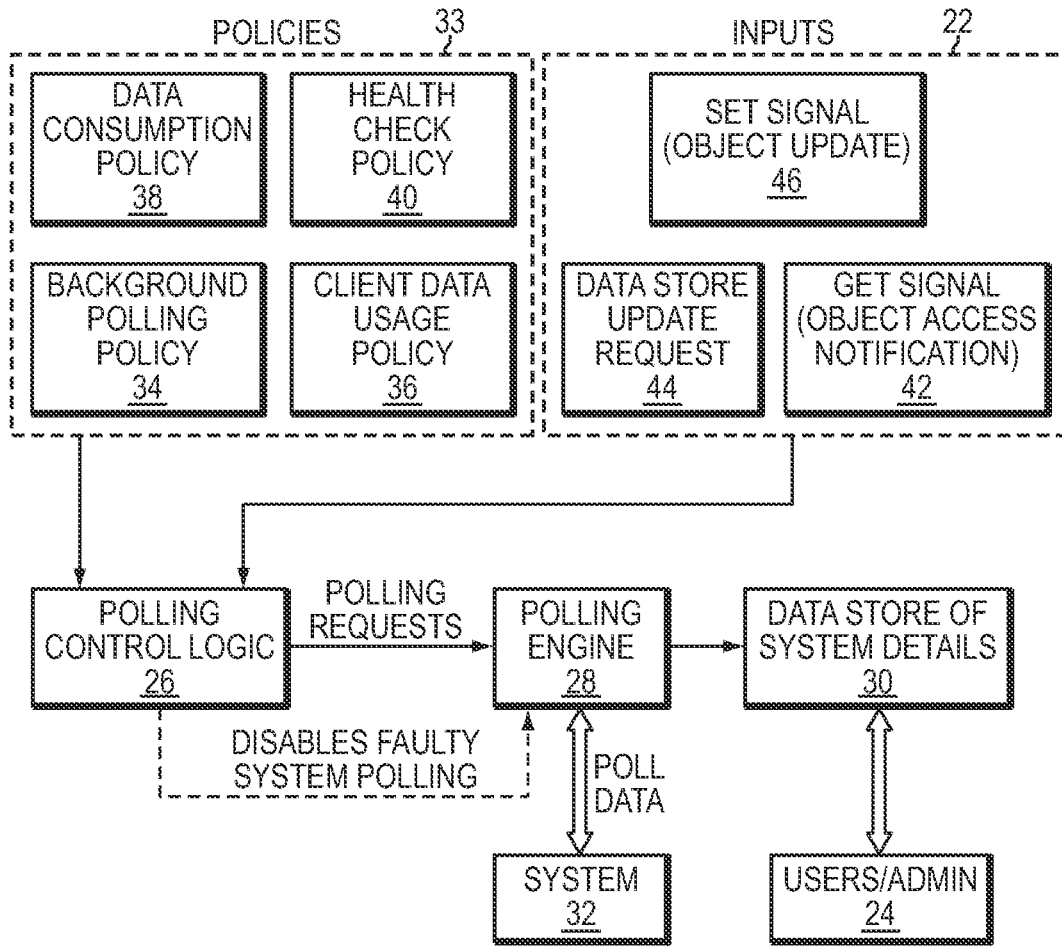

Referring to FIG. 3, shown is a more detailed representation of components that may be included in an embodiment using the techniques herein. One or more of the following policies may be used to help manage the polling: include background polling policy 34, client data usage policy 36, health check policy 40 and data consumption policy 38. Background polling policy 34 indicates a periodic poll that is scheduled at a regular interval in the background. Based on the background poll policy, polling control logic 26 sends the poll request periodically to polling engine 28 to receive updated information from the data store 30. The interval at which polling is scheduled can be configured by user 24 or system 32 based on number of factors such as type of poll data, time consumed in executing last poll request, and so on. Based on health check policy 40, polling control logic 26 actively monitors the health of the data storage system 32 for potential issues by sending a poll request periodically and/or at scheduled times to retrieve updated information for the data store 30. The frequency at which system's health is checked can be configured by a user or a default value is used by the system. Upon receiving unrecoverable errors for a particular component in response to the polling request to receive updated information regarding the health of system 32, polling control logic 26 causes polling engine 28 to stop requesting polling information for that particular component. Based on client data usage policy 38, polling control logic 26 monitors any changes to data store 30 by detecting any user interface session initiated by a user or by receiving notifications when configuration information changes for the system 32. When polling control logic 26 receives GET signal indicating a read operation to the data store 30, a polling request is triggered according to client data usage policy 38. Data consumption policy 38 indicates a policy wherein a polling request is issued when configuration changes are made in the data store 30 by a user. If the system 32 is being actively configured through a command line interface or a user interface by a client of the data storage system, upon receipt of the SET signal, data store 30 is marked dirty and any subsequent read requests to the data store 30 trigger a polling request. Polling control logic 26 also eliminates duplicate polling requests.

Figure 4:
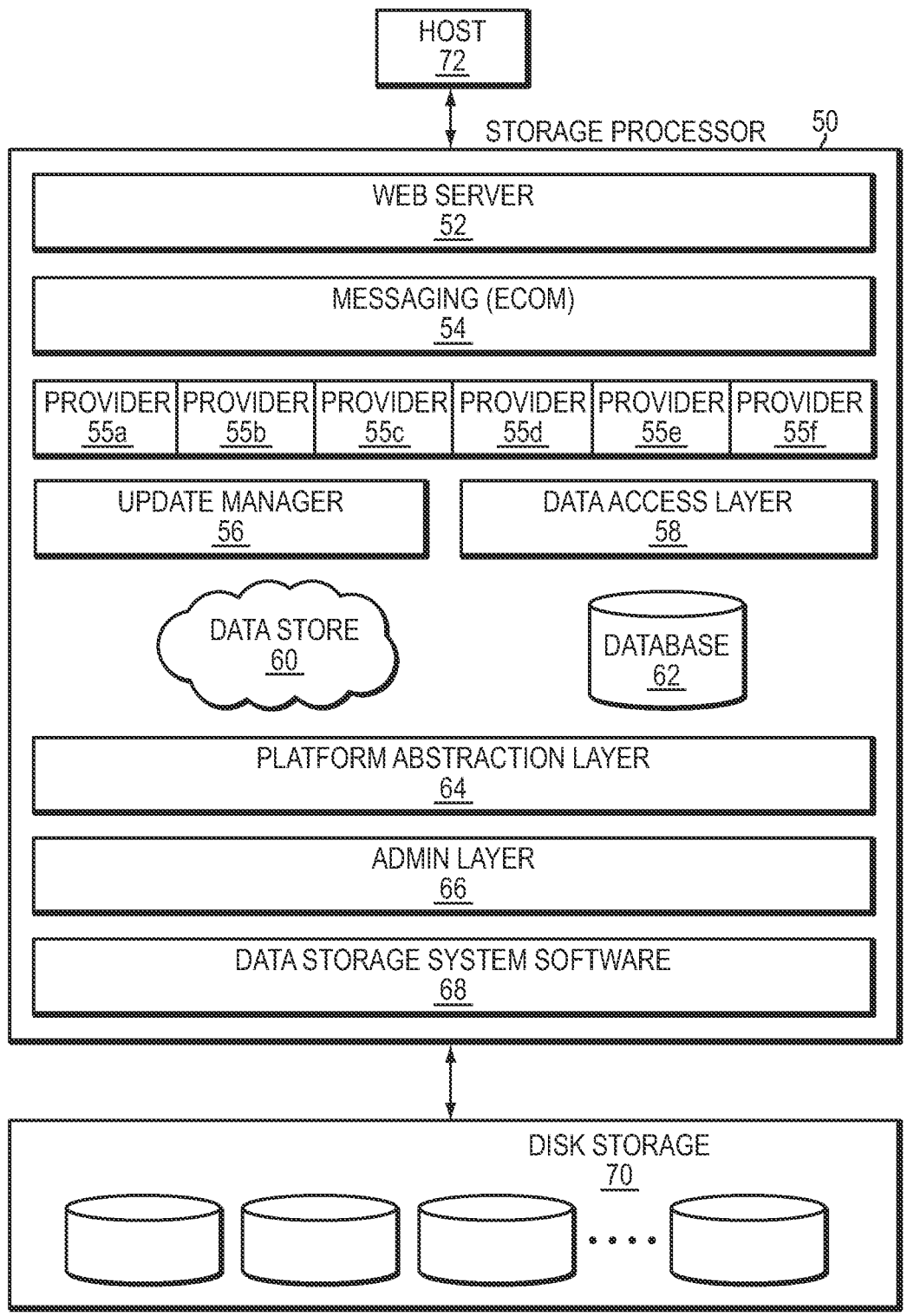

FIG. 4 illustrates additional aspects of data storage system 12 supporting an example implementation of the technique referenced above. Host 72 can access any managed object managed by storage processor 50. A managed object includes any managed object (physical or logical object) in the system (e.g., disk, LUN). In at least one implementation in accordance with the technique, several components of system management reside on host computers 72 and are referred to as client components. The server side management components interact with the user interfaces and tools for administering the system configuration and operation and to report on system operation. The server side components are comprised of middleware which resides between the user and the storage management components of the system which implement management system storage features. The server side components may be comprised of web server 52, messaging layer such as ECOM 54 and various providers 55a-55f. These components use a transport mechanism to communicate with management clients. Update manager 56 provides abstraction for polling control logic 26, polling requests engine 28, update policies 33 and set of inputs 22. Platform abstraction layer 64 is a module that provides support for different administrative interfaces and transforms the data according to different platforms. Admin Layer 66 provides an interface to receive configuration information regarding various system components by interacting with data storage system software 68 that includes different components such as mapped LUNs and RAID groups. Data access layer 58 provides a capability to retrieve configuration information from database 62. Database 62 is a data store of configuration information regarding the disk storage 70 that is retrieved by polling the system as described herein.

It should be noted that the various components used in connection with the techniques described herein may be implemented using hardware and/or software. For example, the components of the client support software may be written in any one or more programming and/or scripting languages such as, for example, C++, Java, and XML.

Figure 5:
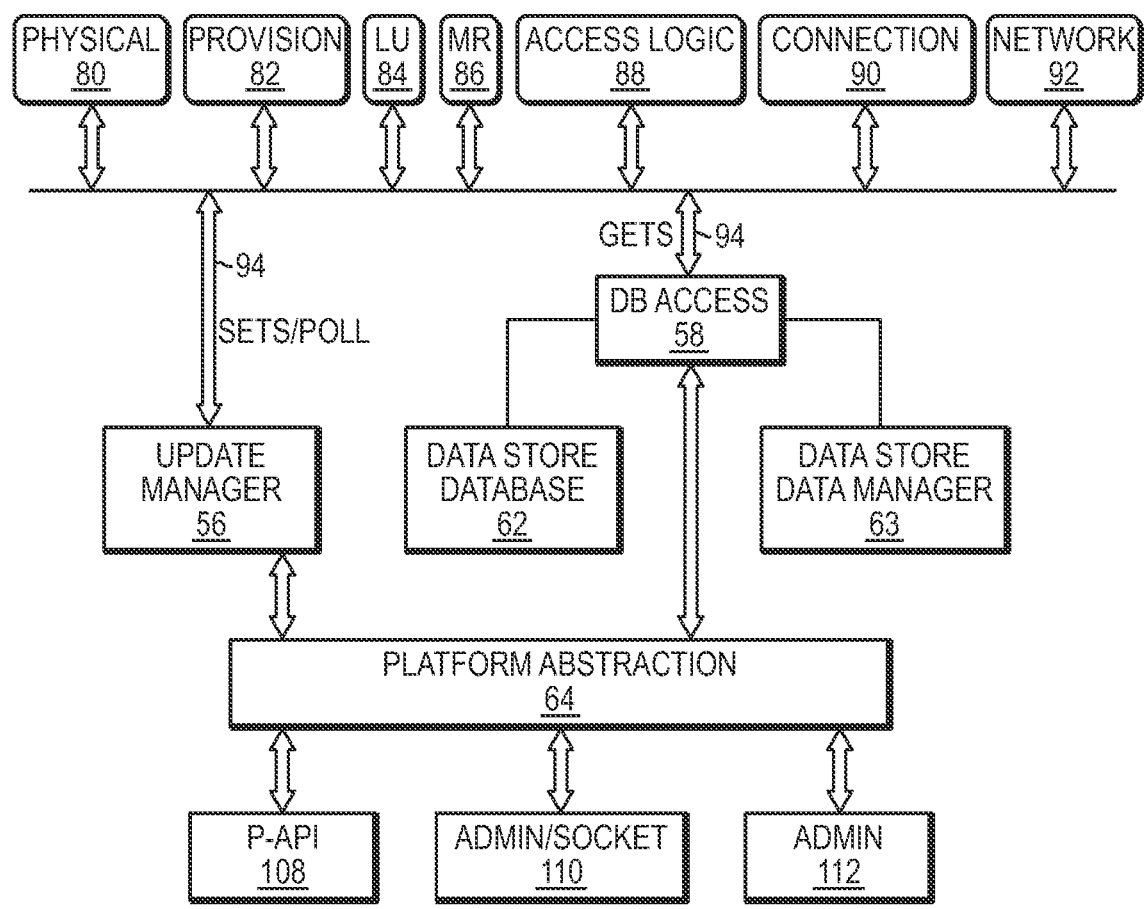

Referring to FIG. 5, shown is more detailed representation of components that may be included in an embodiment using the techniques herein. There are two types of polls: a client poll that is triggered by a client activity and a background poll. Update manager 56 provides centralized control for all types of polls. Polling activity is triggered by a set of pre-defined policies. A goal is to help ensure that clients can access updated data quickly while reducing system impact resulting from periodic polling. Thus, update manager 56 uses an adaptive algorithm to change the polling frequency on detecting client or system activity. Polling requests are also triggered by a set of inputs. One of the inputs is a GET signal 96 that triggers the polling requests whenever data is accessed from the database 62. DB access layer 58 interacts with data store database 62 where configuration data is stored, and also interacts with data store manager 63. Data store manager 63 handles notifications from other components, processes the data and stores the data into the database 62. SET signal 94 is another input that indicates to update manager 56 whether a polling request needs to be generated. Upon receiving poll input 94, update manager 56 schedules a polling request to receive updated configuration status data. Configuration data that is stored in the database 62 may include information regarding physical storage 80, provisional storage 82, LUNs 84, Mapped Replica 86, access logix 88, connection 90 and network 92. Update manager 56 and DB access layer 58 interact with platform abstraction layer 64 that support different administrative interfaces such as admin 112, admin/socket 110 and P-API 108 and provides efficient administrative communication.

Figure 6:
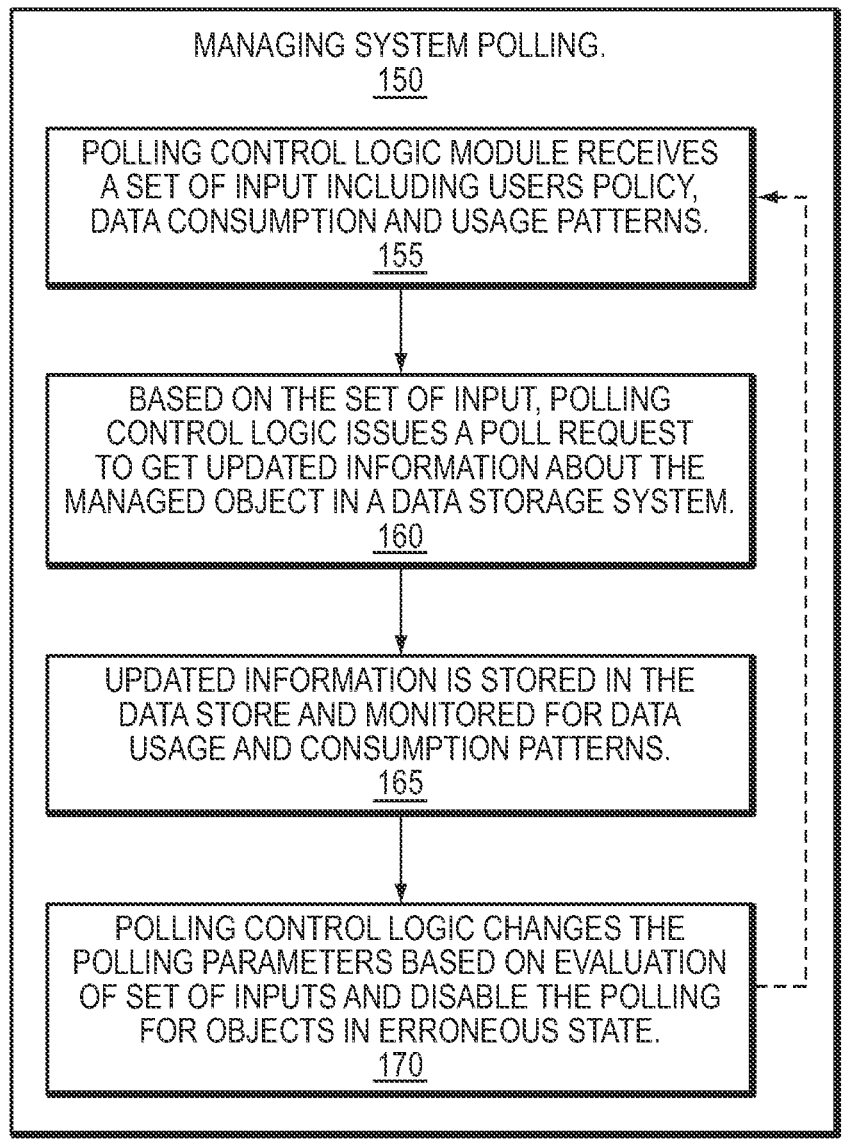
FIGS. 6-9 are flow diagrams illustrating processes that may be used in connection with techniques herein.

Referring to FIG. 6, shown is a flow diagram illustrating the method of managing system polling in a data storage system. With reference also to FIG. 2, managing polling in a system (step 150) starts with polling control logic receiving a set of inputs and a set of policies that may be based on data consumption and usage patterns (step 155). Based on the input and policy in use, polling control logic issues a poll request to receive updated information about the object managed in the data storage system (step 160). Information about managed objects is stored in data store 30. Any update made to data store 30 is further monitored for data usage and consumption patterns (step 165). Based on the monitoring of the information and policies in use, polling control logic 26 changes the polling parameters and disables any further polling of objects that are in faulted state (step 170). Once faulted objects are recovered, polling resumes according to policies set by a user or a system.

Figure 7:
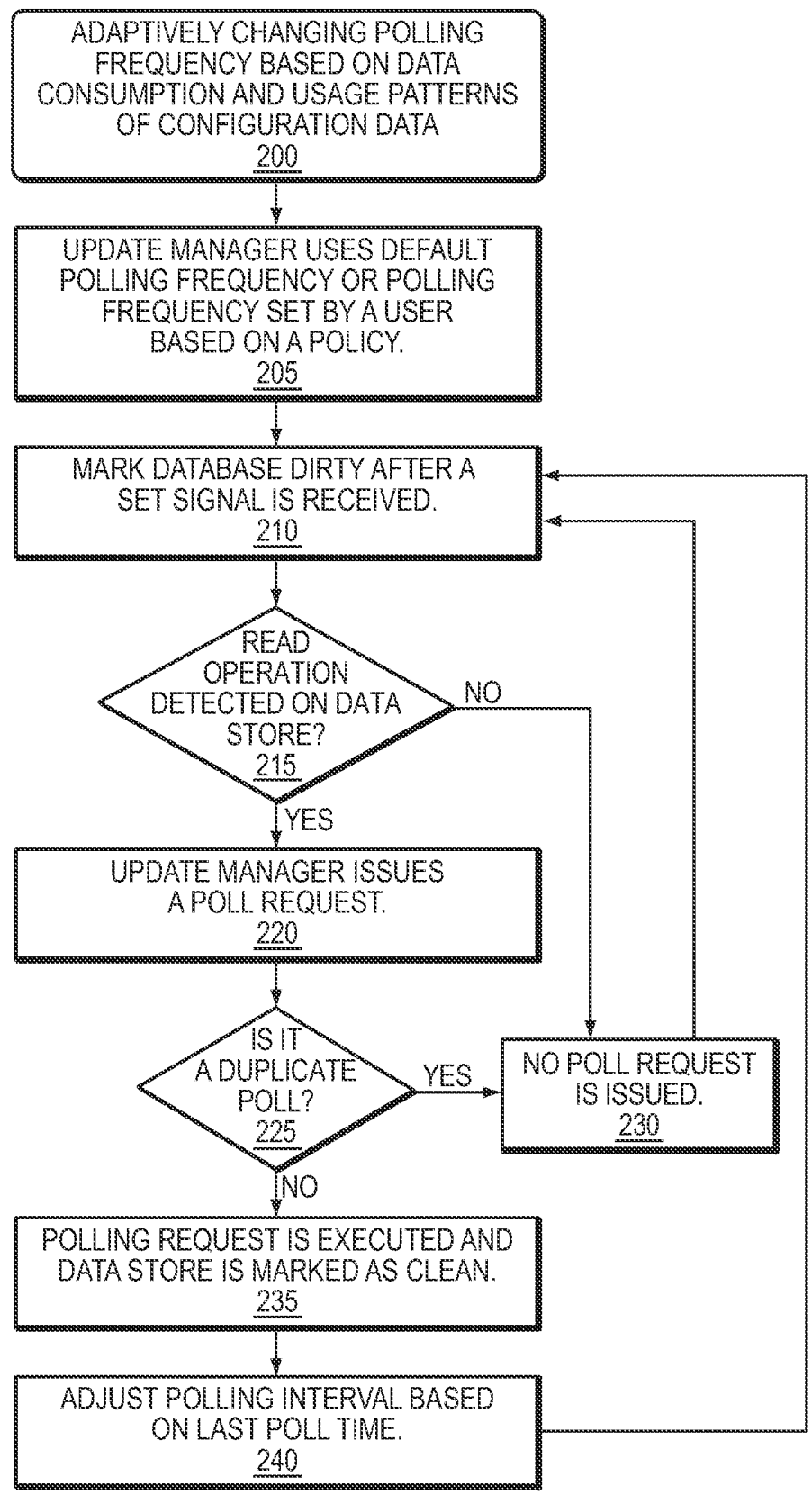

Referring to FIG. 7, shown is a flow diagram illustrating the method of adaptively changing the polling parameters based on data consumption and usage patterns of configuration data (step 200). With reference also to FIGS. 2 and 4, update manager 56 may be comprised of polling control logic 26 and polling engine 28. Update manager 56 uses a polling frequency set by a user based on a policy, and if one is not set, uses a default polling frequency set by system 32 (step 205). Data store 30 is monitored for any updates made to configuration data. Data store database 30 is marked dirty after a SET signal is received (step 210). If no one is trying to access the data from the database 62, no poll is needed (step 230). Any subsequent read requests to data store 30 triggers a polling request (step 215). Thus, upon detecting the read request, update manager 56 issues a polling request (step 220). Additionally, update manager 56 uses a queuing mechanism to avoid issuing a polling request if the polling request is a duplicate (step 225, 230). The duplicate poll request is ignored and no poll request is issued for that duplicate request. Once the polling request is executed, the data store 30 is marked as 'clean' so that monitoring of the database can start all over again (step 235). Update manager 56 then adjusts the polling interval for the background poll based on time it took to service the last poll request (step 240).

Figure 8:
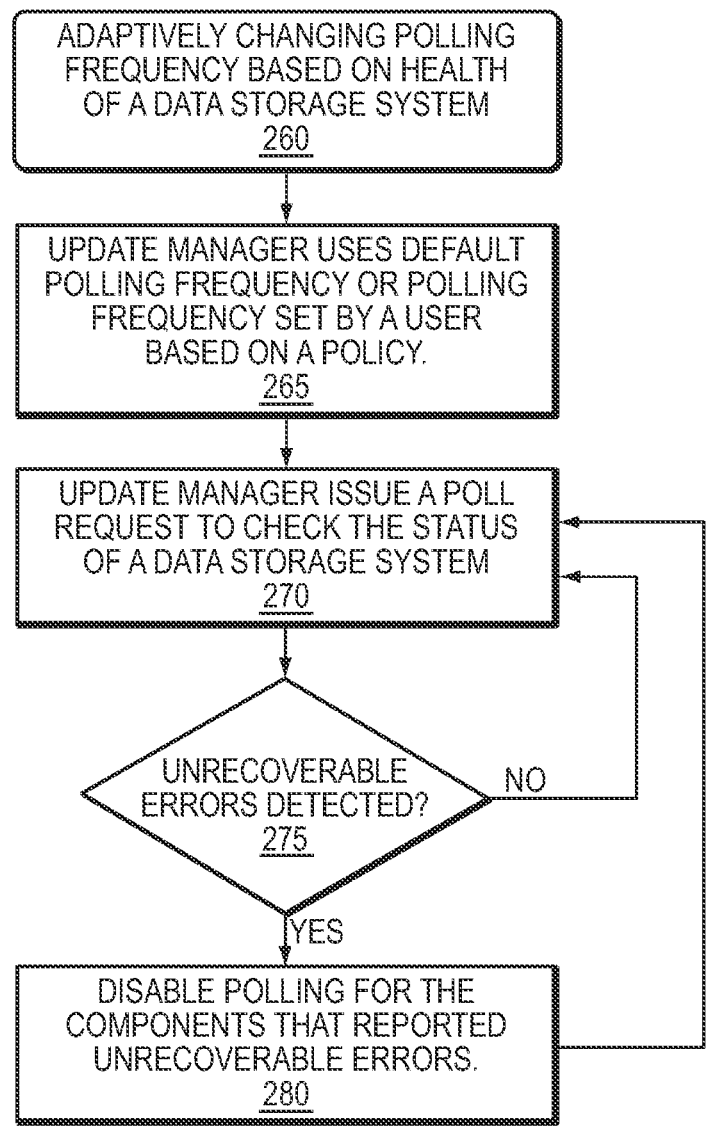

Referring to FIG. 8, shown is a flow diagram illustrating a method of adaptively changing the polling frequency based on the health of a data storage system (step 260). With reference also to FIGS. 2 and 4, update manager 56 uses polling frequency set by a user based on a policy and if one is not set, it uses default polling frequency set by the system 32 (step 265). Update manager 56 then issues a polling request to check health of the data storage system 32. Any reasonable system health alert policy can be configured by system administrators to define how often they want the array to be checked for potential issues. Depending on the object that is polled, polling intervals may range from minutes or hours to days or weeks. Typical polling intervals may be every hour or every few hours. Upon detection of unrecoverable errors further polling is disabled for components that report errors (step 275, 280). Later, polling is enabled when errors are resolved for the faulted components.

Figure 9:
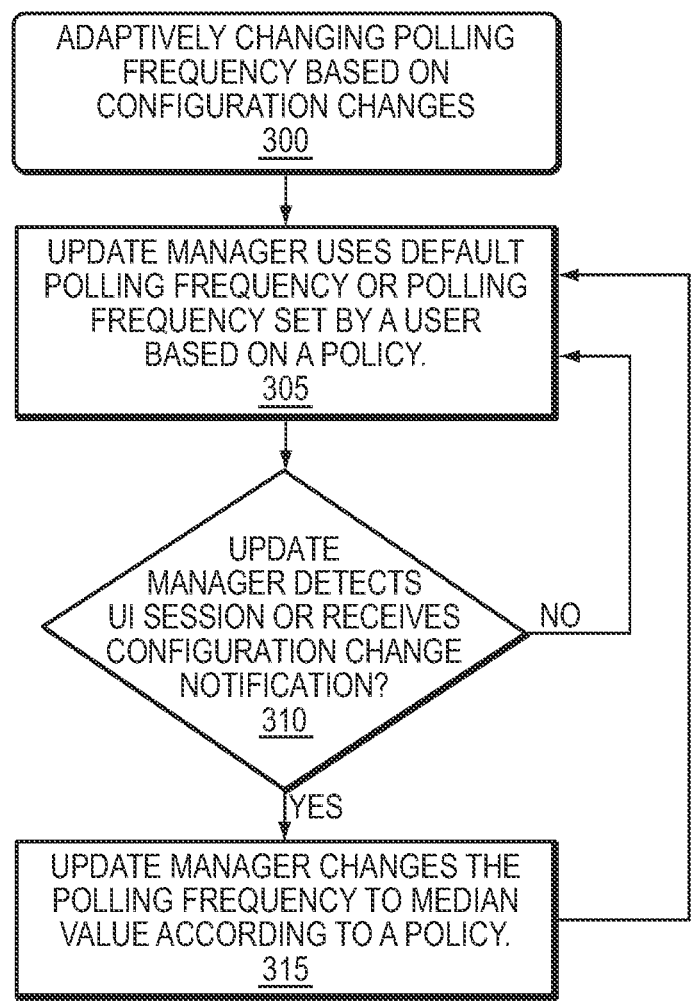

Referring to FIG. 9, shown is a flow diagram illustrating a method of adaptively changing the polling frequency based on configuration changes in a data storage system (step 300). With reference also to FIGS. 2 and 4, update manager 56 uses a polling frequency set by a user based on a policy and if one is not set, it uses default polling frequency set by the system 32 (step 305). A user interface session is connected to the system that monitors the system and also receives notifications if there are any configuration changes made in data store 30. On detecting any configuration change, update manager 56 adaptively changes the polling frequency to a median value based on a policy, for example the polling frequency may be changed to poll every 5 minutes.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing system polling, the method comprising:
   determining polling parameters for receiving updated information for a managed object in a data storage system, wherein the polling parameters are based on a set of criteria, wherein the set of criteria includes a set of policies, wherein the set of policies includes a background polling policy, a data usage policy, a health check policy, and a data consumption policy, wherein the polling parameters include detecting updates to the managed object based on the set of policies;
   based on the polling parameters, polling the managed object, wherein polling the managed object includes polling configuration data associated with the managed object; and
   dynamically changing the polling parameters based on the set of criteria.

2. The method of claim 1, wherein managing system polling further comprises the step of:
   based on the results of polling, disabling polling of the managed object.

3. The method of claim 1, wherein the polling parameters comprises polling frequency.

4. The method of claim 1, further comprising:
   ignoring a request to poll a managed object upon determining that the request is a duplicate request.

5. The method of claim 1, further comprising:
   changing a polling frequency based on time taken to poll the managed object previously.

6. The method of claim 1, wherein the set of criteria comprises a set of conditions and a set of policies.

7. The method of claim 6, wherein the set of policies includes a health check policy indicating a polling frequency for receiving updated information for a managed object in a data storage system.

8. The method of claim 7, further comprising:
   disabling polling of a managed object upon receiving unrecoverable errors on polling the managed object based on the health check policy; and
   enabling polling of the managed object upon resolution of the unrecoverable errors.

9. The method of claim 6, wherein the set of policies includes a background polling policy indicating a polling frequency for periodically receiving updated information for a managed object in a data storage system.

10. The method of claim 6, wherein the set of policies includes a client data usage policy indicating monitoring of updates to information for a managed object in a data storage system.

11. The method of claim 10, further comprising:
    changing a polling frequency upon detecting updates to a managed object based on the client data usage policy.

12. The method of claim 6, wherein the set of policies includes a data consumption policy indicating monitoring of access to information for a managed object in a data storage system.

13. The method of claim 12, further comprising:
    polling a managed object upon detecting access to updated information for the managed object based on the data consumption policy.

14. A system for use in managing system polling, the system comprising:
    a processor;
    first logic determining polling parameters for receiving updated information for a managed object in a data storage system, wherein the polling parameters are based on a set of criteria, wherein the set of criteria includes a set of policies, wherein the set of policies includes a background polling policy, a data usage policy, a health check policy, and a data consumption policy, wherein the polling parameters include detecting updates to the managed object based on the set of policies;
    second logic polling, based on the polling parameters, the managed object wherein polling the managed object includes polling configuration data associated with the managed object; and
    third logic dynamically changing, based on the set of criteria, the polling parameters.

15. The system of claim 14, further comprising
    fourth logic disabling, based on the results of polling, polling of the managed object.

16. The system of claim 14, wherein the polling parameters comprises polling frequency.

17. The system of claim 14, wherein the set of criteria comprises a set of conditions and a set of policies.

18. The system of claim 17, wherein the set of policies includes a health check policy indicating a polling frequency for receiving updated information for a managed object in a data storage system.

19. The system of claim 17, wherein the set of policies includes a background polling policy indicating a polling frequency for periodically receiving updated information for a managed object in a data storage system.

20. The system of claim 17, wherein the set of policies includes a client data usage policy indicating monitoring of updates to information for a managed object in a data storage system and a data consumption policy indicating monitoring of access to information for a managed object in a data storage system.

* * * * *